United States Patent [19]

Knowlton

[11] 4,198,158
[45] Apr. 15, 1980

[54] HIGH RESOLUTION DISPLAY

[75] Inventor: Kenneth C. Knowlton, Plainfield, N.J.

[73] Assignee: Bell Telephone Laboratories, Incorporated, Murray Hill, N.J.

[21] Appl. No.: 896,179

[22] Filed: Apr. 14, 1978

[51] Int. Cl.[2] .................. G03B 27/32; B41B 13/00; G03B 41/00

[52] U.S. Cl. .................. 355/54; 346/107 R; 355/40; 354/5

[58] Field of Search .................. 355/40–43, 355/52–54, 1; 354/115, 4–6, 7; 346/107 R; 358/298

[56] References Cited

U.S. PATENT DOCUMENTS

| | | | |
|---|---|---|---|
| 3,573,789 | 4/1971 | Sharp et al. | 340/728 |
| 3,604,846 | 9/1971 | Behane et al. | 358/263 |
| 3,637,307 | 1/1972 | Spitz | 355/40 |
| 3,703,135 | 11/1972 | Lang | 355/54 |
| 3,832,488 | 8/1974 | Fahey et al. | 354/7 X |
| 3,898,005 | 8/1975 | Roberts | 355/54 |
| 3,921,164 | 11/1975 | Anderson | 340/728 |
| 3,997,719 | 12/1976 | Jadice | 358/240 |
| 4,081,828 | 3/1978 | Jones et al. | 358/75 |
| 4,090,206 | 5/1978 | Pfeifer et al. | 354/11 X |
| 4,096,486 | 6/1978 | Pfeifer et al. | 354/4 X |
| 4,107,687 | 8/1978 | Pfeifer et al. | 354/5 X |

*Primary Examiner*—L. T. Hix
*Assistant Examiner*—W. J. Brady
*Attorney, Agent, or Firm*—Ronald D. Slusky; Thomas Stafford

[57] ABSTRACT

High resolution, hard copy images are provided by superimposing a plurality of matrix display images on a record medium. The images are offset from one another such that they interleave. The matrix display is illustratively an ac plasma panel; the record medium is illustratively photographic film. Successive images presented on the plasma panel are caused to be offset from one another on the record medium illustratively by interposing a tilted plate of glass between the plasma panel and the record medium.

9 Claims, 12 Drawing Figures

FIG. 1
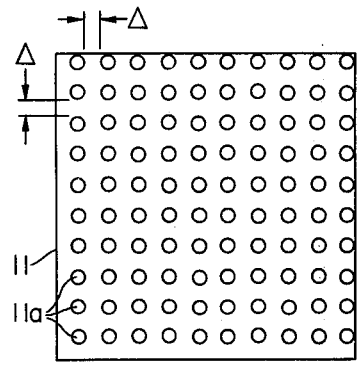
FIG. 11
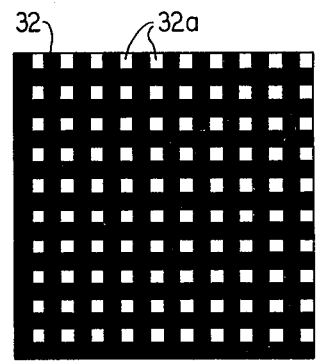
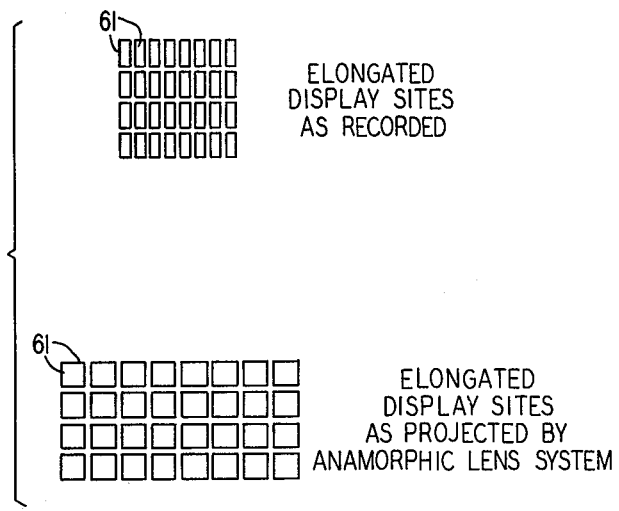
FIG. 12

HIGH RESOLUTION DISPLAY

BACKGROUND OF THE INVENTION

The present invention is directed to apparatus for producing high resolution, hard copy images.

Among the innumerable uses to which modern-day computer systems are put is in the generation of graphic output images. These may range from simple x-y plots to perspective representations of three-dimensional forms and surfaces. A particular class of display devices on which such images can be presented is so-called matrix displays. As the name suggests, the images displayed by these devices are made up of a matrix of discrete display points, or sites, which are typically arranged in a row-and-column array. Among the unique characteristics of matrix displays is that each display site can be randomly addressed and its state, e.g., "bright" or "dark," independently specified. Advantageously, this renders matrix displays easily interfaced with and controlled by digital computer circuitry.

Matrix displays are of two general types. Printing, or nonreactive, displays, such as ink jet and electrostatic pin printers, generate hard copy images on a permanent record medium—paper. On the other hand, electronic, or reactive, displays, such as the ac plasma panel, generate nonpermanent images via the selective energization of individual light-emitting or light-absorbing display elements.

In order, for example, to represent fine detail and provide smooth, well-rounded curves in graphic output images, it is necessary for the images to have relatively high resolutions (sites per cm). The images, as generated, may already have such high resolutions. Alternativelly, arrangements have been devised which process an input image having a relatively low resolution to transform it into an output image of higher resolution. Illustrative are the arrangements disclosed in the following U.S. Pat. Nos. 3,921,164 issued Nov. 18, 1975 to B. M. Anderson; 3,604,846 issued Sept. 14, 1971 to D. Behane et al; 3,573,789 issued Apr. 6, 1971 to J. V. Sharp et al. In either case, the ability to display the high resolution image is, of course, dependent on the availability of a high-resolution display device.

SUMMARY OF THE INVENTION

The principal object of my invention, then, is to provide a high-resolution matrix display.

This and other objects are achieved in accordance with the invention by a display system which generates a composite image on a permanent record medium such as photographic film by superimposing thereon a plurality of constituent images presented on a reactive display, i.e., one having selectively energizable display sites. The constituent images are interleaved on the record medium so that the display sites of one image fall within the gaps between the display sites of the other images superimposed on the same record medium. The resolution of the recorded, composite, image is, in general, at least double that capable of being provided by the reactive display which generated the constituent images.

The reactive display is illustratively an ac plasma panel or other device having display site diameters which are no greater than the distance between adjacent sites. This allows the constituent images to be interleaved on the record medium without overlapping. If desired, precise shaping of the display sites can be achieved by interposing a mask between the display and the record medium. This technique can be used, for example, to reduce the size of each site, allowing a greater number of constituent images to be interleaved without overlapping.

The constituent images can be presented serially on the same reactive display with means interposed between the display and the record medium to offset each successively presented constituent image by the appropriate amount on the record medium. Such means may advantageously comprise a transparent, illustratively glass, plate oriented differently for each constituent image such that the refraction of the image through the plate provides the appropriate offset. In particular, where four images are to be interleaved, the desired offsets may be provided by rotating an appropriately oriented transparent plate in ninety-degree steps for each of the four constituent images.

BRIEF DESCRIPTION OF THE DRAWING

In the drawing,

FIG. 1 depicts a 10×10 array of display sites of a reactive display;

FIG. 11 depicts a mask illustratively used in the display system of FIG. 10; and FIG. 12 illustrates the effect of using a special purpose mask in a display system such as that shown in FIG. 10 in order to provide particular display site shaping.

DETAILED DESCRIPTION

The principle of interleaving a plurality of constituent images to provide a higher resolution composite image in accordance with the invention is illustrated in FIGS. 1–9.

In particular, FIGS. 1–5 show an array 11 of display sites of a reactive display. There are, illustratively, one hundred sites 11a, arranged in a row-and-column array of ten rows and ten columns. (In practice, many more, e.g., a 512-by-512 array of, sites would typically be used.) In FIG. 1, all sites are depicted in the bright state. The diameter of each display site is no greater than (and, in this case, is approximately equal to) the distance Δ between adjacent sites. FIGS. 2–5 each depict array 11 with different sites being in the bright state to provide four constituent images.

Figure 5:
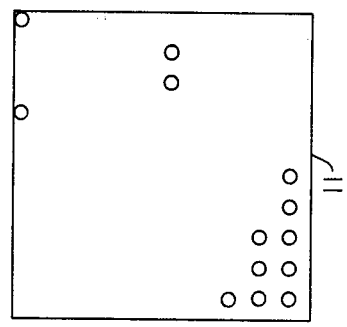
FIGS. 2–5 depict the array of FIG. 1 with different display sites in the bright state in each FIG. so as to provide four images. These four images are adapted to be interleaved in accordance with the invention to provide a higher-resolution composite image.
Figure 9:
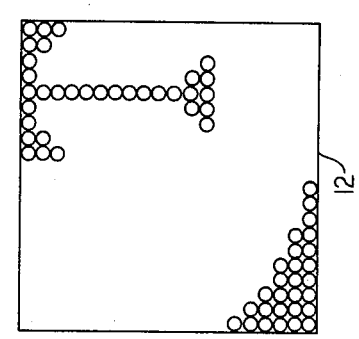
FIGS. 6–9 depict a record medium on which the images of FIGS. 2–5 are interleaved.
Figure 4:
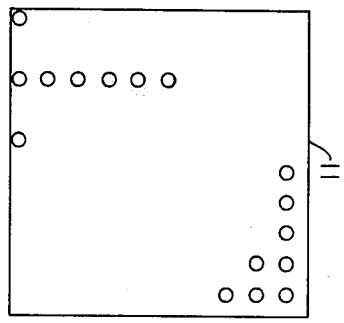
Figure 8:
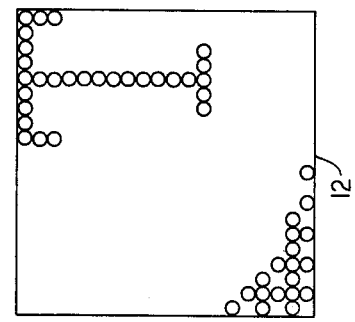
Figure 3:
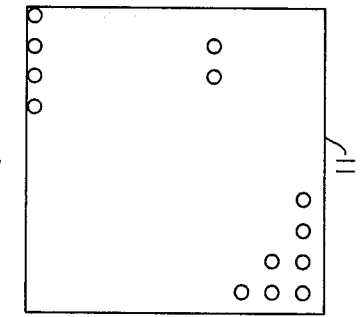
Figure 7:
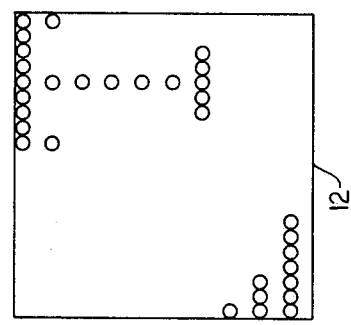
Figure 2:
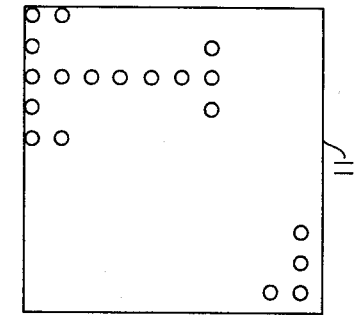
Figure 6:
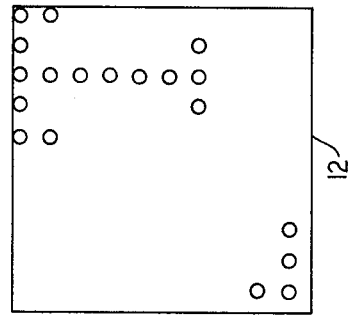

FIGS. 6–9 represent a region 12 of a record medium on which the images of FIGS. 2–5 are to be interleaved, i.e., superimposed offset from one another, in accordance with the invention. In particular, FIG. 6 shows medium 12 with only the image of FIG. 2 recorded thereon. FIG. 7 shows medium 12 with the image from FIG. 3 superimposed on the image from FIG. 2 but offset to the left by Δ. FIG. 8 shows medium 12 with the image from FIG. 4 superimposed on the two images already recorded but offset downward by Δ. FIG. 9 shows medium 12 with the image from FIG. 5 superimposed on the three already recorded but offset to the left by Δ and downward by Δ. It will be appreciated from FIG. 9 that the interleaving of, i.e., superimposition of offset, images in accordance with the invention has provided a composite image on record medium 12 with twice the vertical resolution and twice the horizontal resolution capable of being provided by array 11 by itself.

The four images to be interleaved may be arrived at in various ways, depending on the application. For example, where the composite image is to consist of alphanumeric or other characters of predetermined configuration, such as the "T" in FIGS. 2-9, the sites which are to be in the bright site for each of the four images of each character can be stored in memory and assembled into words of text or other character strings, as needed. Another possible application of the invention could be in generating pseudo-gray scale images such as shown in U.S. Pat. No. 3,997,719 issued on Dec. 14, 1976 to C. N. Judice. A so-called dithered image could be generated in accordance with the teachings of the Judice patent by scanning the source image at the desired composite image resolution and then successively displaying as the four images to be interleaved, the even- and then the odd-numbered sites of first the even- and then the odd-numbered rows. In more generalized applications in which a single, low resolution image is provided to the display system, various interpolation routines could be employed to determine the states of sites in each of the four constituent images. It may also be noted that in particular applications, one or more of the techniques described in the patents cited in the Background Section hereof may be able to be used in conjunction with the invention.

Figure 10:
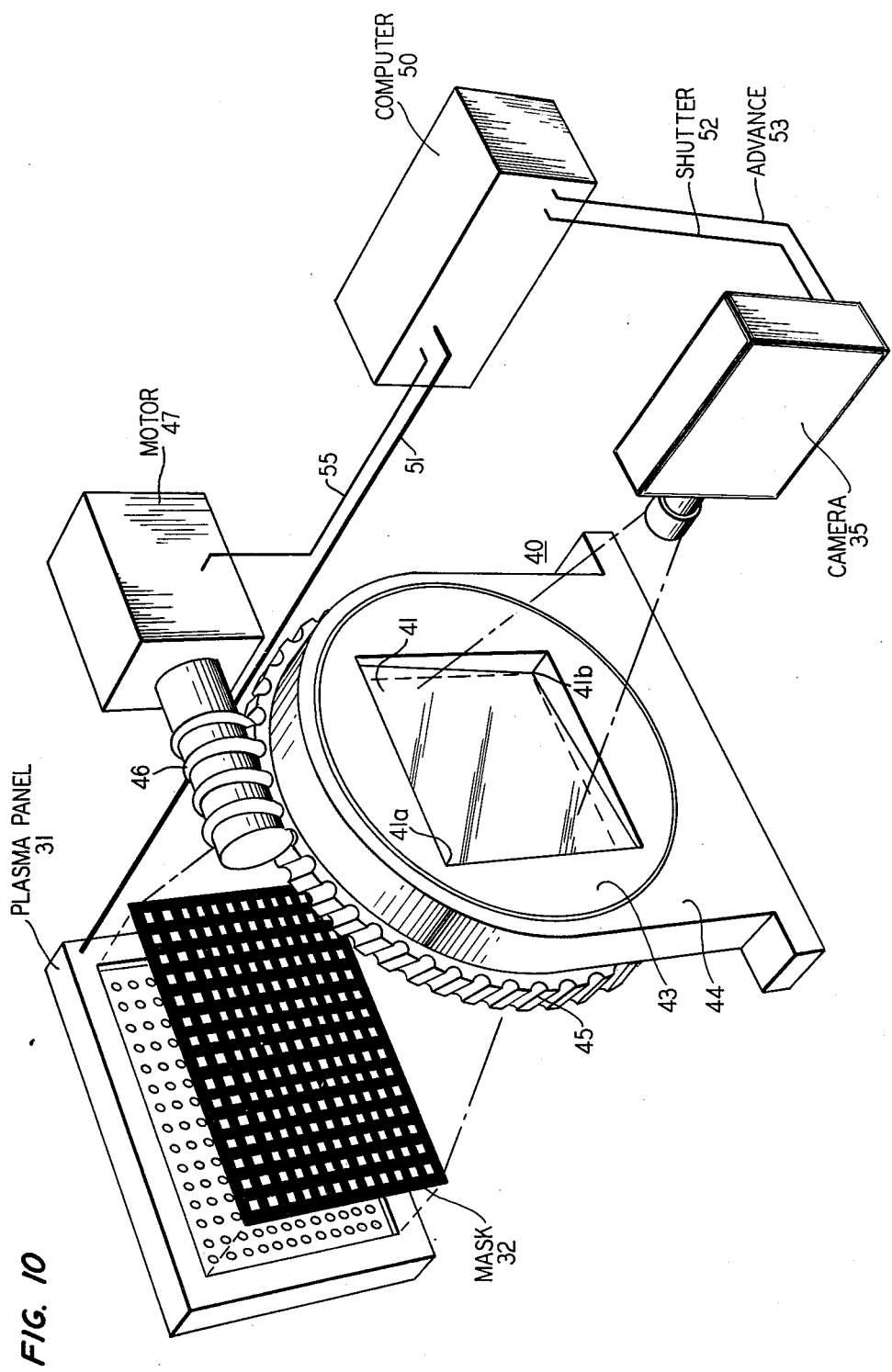
FIG. 10 depicts a display system embodying the principles of the present invention.

A display system which achieves the image interleaving technique of the present invention is shown in FIG. 10. The system includes an ac plasma panel 31 as its reactive display and a camera 35 which holds photographic film as the record medium on which the composite image is formed.

As in the example of FIGS. 2-9, the display system of FIG. 10 illustratively interleaves four images, successively presented on plasma panel 31, to form a composite image on the photographic film. The requisite offsetting of the four displayed constituent images is provided by an assembly 40 interposed between the plasma panel and the camera. Assembly 40 includes a transparent, illustratively glass, plate 41 secured within a housing 43 which is rotatably mounted within a bracket 44. Housing 43 has a toothed flange 45 which engages a worm gear 46 mounted on the shaft of a stepping motor 47. Operation of motor 47 thus produces rotation of plate 41.

Plasma panel 31, camera 35 and assembly 40 are all controlled by a digital computer 50. In operation, computer 50 transmits to plasma panel 31 via cable 51 each of the four images to be superimposed on the film within camera 35. As each constituent image is presented in turn, the computer pulses camera 35 over shutter lead 52 to record the image. Before the next shutter operation, computer 50 pulses motor 47 over lead 55 such that plate 41 is rotated through a ninety-degree step. Plate 41 is mounted in a tilted position within housing 43 such that corner 41a thereof is closer to camera 35 than any of the other corners and corner 41b is further away than any of the other corners. As a result, refraction of light as it passes through the glass plate in each of its four orientations is such as to offset the images presented on plasma panel 31 as described in connection with the example of FIGS. 2-9. The proper positioning of plate 41 within housing 43 to achieve the required amount of offset is easily arrived at empirically.

After all four composite images have been superimposed on the film in camera 35, computer 50 pulses film advance lead 53 in preparation for the next image.

The display system of FIG. 10 also illustratively includes a mask 32 placed directly in front of e.g., attached to the face of, plasma panel 31. Shown in greater detail in FIG. 11, mask 32 is illustratively comprised of a matrix of transparent openings 32a. Openings 32a have a just slightly (e.g. 2 percent) smaller center-to-center separation than the display sites of plasma panel 31 so that the openings and sites can be aligned with each other as viewed from the camera lens on a one-to-one basis. The width and height of openings 32a are, however, somewhat smaller than the nominal display site diameter.

A mask such as mask 32 may be employed for any of several reasons. For example, the display sites of an ac plasma panel, although appearing to be symmetrical points of light are, in actuality, irregular in shape. Interposing mask 32 in front of plasma panel 31 and focusing camera 35 on the mask effectively provides a more regular display site shape on the record medium, resulting in a subjectively more pleasing image. It will be noted, moreover, that mask 32 effectively decreases the display site diameter (as seen by camera 35) while increasing the space between adjacent sites, e.g., the dimension Δ in FIG. 1. This allows the present invention to be used in conjunction with reactive displays which, without the mask, would not have sufficient space between adjacent sites to allow images to be interleaved without overlapping.

In addition, if openings 32a are made small enough, even more than four (e.g., nine or sixteen) plasma panel or other reactive display images could be interleaved in accordance with the invention, providing even greater resolution in the composite image. In such an arrangement, the image offsetting apparatus could include, for example, two independently rotatable glass plates to provide the desired nine- or sixteen-fold offsetting. Alternatively, tilting mirror systems could be used in which the reactive display image is reflected to the record medium at different angles—again under stepping motor control—to provide the desired image offset. Of course, a mask may not be needed at all if the gaps between adjacent sites of the display used are large enough.

Other variations are possible. Thus, for example, by using appropriate offsetting apparatus, the image interleaving could be carried out so as to provide other than rectangular arrays of display sites in the composite image and/or other than square patterns of recorded sites derived from each reactive site. Hexagonal clusters of sites might be desired, for example. In addition, a mask may be used which provides particular display site shaping. For example, as illustrated by sites 61 in FIG. 12, the sites might be given a vertically elongated shape when recorded. The recorded image can thereafter be projected via an anamorphic lens system to yield a so-called wide-screen, or double-width, projected image.

It will be appreciated that although the arrangements described above illustrate the principles of the invention, numerous other arrangements embodying those principles may be devised by those skilled in the art without departing from their spirit and scope.

I claim:

1. A display system comprising
a plurality of selectively energizable spaced-apart display sites, and
means for recording a first image of each of said sites on a record medium,
said recording means characterized by means for recording a second image of each of said sites on said record medium, each said second image of each site being recorded between first images of that site and an adjacent display site.

2. The invention of claim 1 wherein in each of said first and second images the diameter on said record medium of each one of said sites is no greater than the distance between that site and the immediately adjacent site.

3. The invention of claim 1 wherein said sites are arranged in a row and column array.

4. The invention of claim 3 wherein said sites are the display sites of a plasma panel.

5. The invention of claim 1 further comprising
a mask disposed between said sites and said record medium, said mask being adapted to define the shapes of the images of said sites on said record medium.

6. The invention of claim 2 wherein said recording means is further characterized by means for recording third and fourth images of each of said sites on said record medium such that said third and fourth images are interleaved on said record medium with each other and with said first and second images.

7. A display system comprising
a plurality of selectively energizable spaced-apart display sites, and
means for recording a first image of said sites on a record medium,
said recording means characterized by means for recording a second image of said sites on said record medium, a transparent plate disposed between said sites and said record medium, and means for varying the orientation of said plate with respect to said sites so that at least said second image is refracted by said plate and interleaved with said first image on said record medium.

8. The invention of claim 7 wherein said varying means includes means for rotating said plate.

9. A display system comprising
a plurality of selectively energizable spaced-apart display sites, and
means for recording a first image of said sites on a record medium,
said recording means characterized by means for recording second, third and fourth images of said sites on said record medium, a transparent plate disposed between said sites and said record medium, and means for rotating said plate in ninety degree steps so that each image is refracted by said plate and interleaved with every other image on said record medium, wherein the diameter of said first and second image of each site on said record medium is no greater than the distance between that site and an immediately adjacent site.

* * * * *